(12) United States Patent
Lof et al.

(10) Patent No.: US 11,590,580 B2
(45) Date of Patent: Feb. 28, 2023

(54) TURNING TOOL FOR METAL CUTTING COMPRISING A COOLANT CHANNEL

(71) Applicant: AB SANDVIK COROMANT, Sandviken (SE)

(72) Inventors: Ronnie Lof, Sandviken (SE); Adam Johansson, Sandviken (SE); Krister Wikblad, Gavle (SE)

(73) Assignee: AB SANDVIK COROMANT, Sandviken (SE)

( * ) Notice: Subject to any disclaimer, the term of this patent is extended or adjusted under 35 U.S.C. 154(b) by 118 days.

(21) Appl. No.: 16/979,632

(22) PCT Filed: Feb. 28, 2019

(86) PCT No.: PCT/EP2019/054952
§ 371 (c)(1),
(2) Date: Sep. 10, 2020

(87) PCT Pub. No.: WO2019/174921
PCT Pub. Date: Sep. 19, 2019

(65) Prior Publication Data
US 2021/0039173 A1     Feb. 11, 2021

(30) Foreign Application Priority Data

Mar. 13, 2018  (EP) .................................... 18161515

(51) Int. Cl.
*B23B 27/10* (2006.01)
*B23Q 11/10* (2006.01)

(52) U.S. Cl.
CPC ........ *B23B 27/10* (2013.01); *B23B 2200/081* (2013.01); *B23B 2205/12* (2013.01); *B23B 2205/16* (2013.01); *B23Q 11/10* (2013.01)

(58) Field of Classification Search
CPC .............. Y10T 407/14; B23B 2205/12; B23B 2205/16; B23B 27/10; B23B 2200/081; B23Q 11/10
See application file for complete search history.

(56) References Cited

U.S. PATENT DOCUMENTS 3,137,918 A    6/1964  Breuning
3,314,126 A *  4/1967  Stier ................... B23B 27/1622
                                                       407/105

(Continued)

FOREIGN PATENT DOCUMENTS

EP    1002608 A2   5/2000
EP    2446990 A1   5/2012
(Continued)

*Primary Examiner* — Sara Addisu
(74) *Attorney, Agent, or Firm* — Corinne R. Gorski (57) ABSTRACT

A turning tool includes a tool body and a turning insert, and an insert seat in which the turning insert is mounted. The insert seat includes a bottom surface and a side surface, the side surface having a first surface and a second surface. The first surface includes a contact surface, wherein the contact surface is in contact with a portion of the side surface of the turning insert. The tool body includes a coolant channel, which extends between a coolant channel inlet and a coolant channel outlet opening into a void between the side surface of the turning insert and the first surface of the side surface of the insert seat.

15 Claims, 4 Drawing Sheets

(56) References Cited

U.S. PATENT DOCUMENTS

| | | | | |
|---|---|---|---|---|
| 3,889,520 | A * | 6/1975 | Stoferle | B23Q 17/0928 |
| | | | | 73/104 |
| 9,623,493 | B2 * | 4/2017 | Morrison | B23C 5/1045 |
| 2001/0007215 | A1 * | 7/2001 | Murata | B23B 27/10 |
| | | | | 83/16 |
| 2007/0280790 | A1 * | 12/2007 | Kovac | B23B 27/1662 |
| | | | | 407/103 |
| 2009/0320655 | A1 * | 12/2009 | Grant | B23C 5/28 |
| | | | | 29/564 |
| 2010/0239377 | A1 * | 9/2010 | Morrison | B23C 5/28 |
| | | | | 407/42 |
| 2011/0033252 | A1 | 2/2011 | Nishida | |
| 2015/0343536 | A1 * | 12/2015 | Ai | B23B 27/145 |
| | | | | 407/66 |
| 2016/0151871 | A1 * | 6/2016 | Grant | G05B 19/182 |
| | | | | 29/557 |
| 2016/0288216 | A1 * | 10/2016 | Joo | B23B 27/1662 |
| 2019/0118273 | A1 * | 4/2019 | Kawasaki | B23B 29/22 |
| 2020/0038962 | A1 * | 2/2020 | Kobayashi | B23B 27/10 |
| 2021/0114118 | A1 * | 4/2021 | Choi | B23B 27/1644 |

FOREIGN PATENT DOCUMENTS

| | | | |
|---|---|---|---|
| EP | 3153257 | A1 | 4/2017 |
| EP | 3153261 | A1 | 4/2017 |
| JP | 60127904 | A * | 7/1985 |
| JP | H06254704 | A | 9/1994 |
| JP | 10094904 | A * | 4/1998 |
| JP | 2011005618 | A * | 1/2011 |
| JP | 2014046446 | A | 3/2014 |
| WO | 2008/088627 | A1 | 7/2008 |
| WO | 2018034133 | A1 | 2/2018 |

* cited by examiner

TURNING TOOL FOR METAL CUTTING COMPRISING A COOLANT CHANNEL

RELATED APPLICATION DATA

This application is a § 371 National Stage Application of PCT International Application No. PCT/EP2019/054952 filed Feb. 28, 2019 claiming priority to EP 18161515.4 filed Mar. 13, 2018.

TECHNICAL FIELD OF THE INVENTION

The present invention belongs to the technical field of metal cutting. More specifically the present invention belongs to the field of turning tools used for metal cutting in machines such as CNC-machines.

BACKGROUND OF THE INVENTION AND PRIOR ART

The present invention refers to a turning tool comprising a tool body and a turning insert, the turning tool comprising an insert seat in which insert seat the turning insert is mounted, a longitudinal axis extends from a rear end to a forward end, the insert seat comprising a bottom surface and a side surface, the side surface comprising a first surface and a second surface, wherein the first and second surface form an angle relative to each other, the turning insert comprising a top surface, an opposite bot-tom surface, and a side surface connecting the top and bottom surfaces, the bottom surface of the turning insert is in contact with the bottom surface of the insert seat, a portion of the side surface of the turning insert is in contact with the side surface of the insert seat, the tool body comprising a coolant channel, the coolant channel extends between a coolant channel inlet and a coolant channel outlet.

Figure 2:
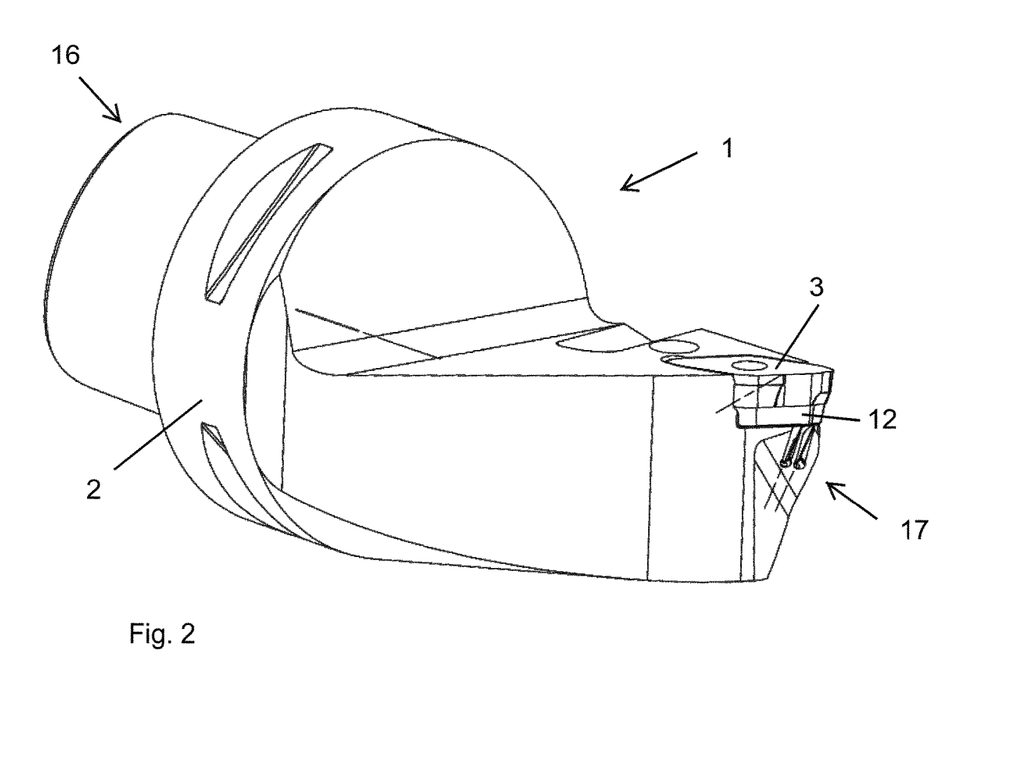
FIG. 2 is a further perspective view of the cutting tool in FIG. 1.
Figure 8:
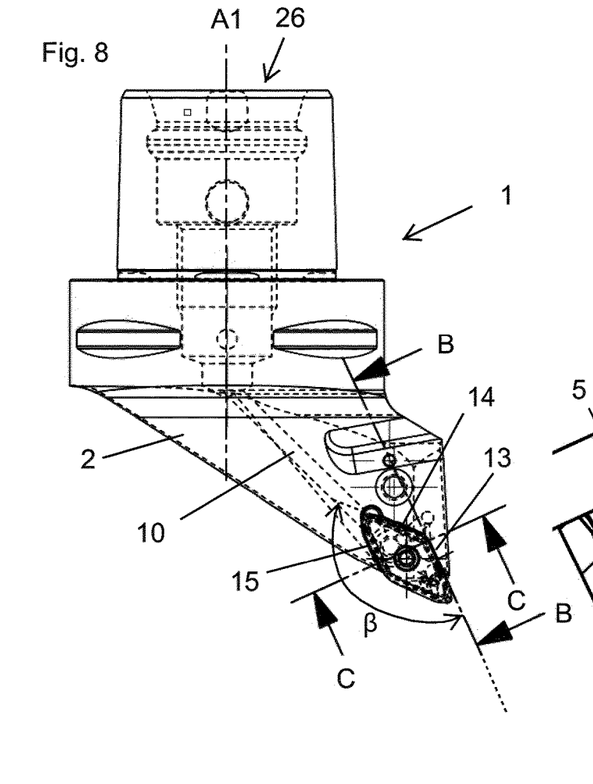
FIG. 8 is a top view of the cutting tool shown in FIG. 1 with the coolant channel and other features shown in hidden lines.

Such a turning tool is known from EP 3153261 A1, where a turning tool comprises a turning insert mounted in an insert seat formed in a tool body. A coolant channel may be provided to a coolant channel outlet spaced apart from the insert seat, below the turning insert as shown in FIG. 8. Said turning tool is advantageously used in longitudinal turning as shown in FIG. 2, thereby forming a machined surface.

Although the above described turning tool and machining method has been found to provide significant positive benefits, the inventors have found that there is a need for an improved turning tool. Especially, the inventors have found that there is a need for a turning tool which can be used for a longer time, especially in longitudinal turning during long time in cut, such as e.g. shafts having a length greater than 300 mm.

SUMMARY OF THE INVENTION

The object of the present invention is to provide an improved turning tool which can be used for a longer time, especially in longitudinal turning during long time in cut.

This object is achieved with the initially defined turning tool, which is characterized in that the coolant channel outlet opens into a void between the side surface of the turning insert (3) and the first surface of the side surface of the insert seat.

By such a turning tool, the inventors have found that the risk of plastic deformation of the insert seat is reduced, thereby increasing the time which the turning tool, and especially the tool body, can be used.

By such a turning tool, the temperature is of the insert seat and especially the temperature of the contact surface. Thereby the risk of deformation of the tool body is reduced if the tool body is made from a material where the yield strength of the material is reduced with increasing temperature.

The turning tool is suitable for longitudinal turning of a rotating metal work piece, i.e. turning where the feed direction is parallel to the rotational axis of a metal work piece. Said turning tool is preferably suitable also for turning in a direction perpendicular to and away from a rotational axis of a rotating metal work piece, where the longitudinal axis is perpendicular to said rotational axis. In other words, the turning tool is suitable for longitudinal turning using a first cutting edge adjacent to a nose cutting edge, and preferably suitable for turning in a direction perpendicular to and away from a rotational axis of the metal work piece to be machined (out-facing) using a second cutting edge adjacent to the nose cutting edge, where the nose cutting edge is between and connecting the first and second cutting edges, and where the longitudinal axis of the turning tool is perpendicular to the rotational axis of the metal work piece.

The turning tool comprises a tool body, preferably made from steel, and a turning insert preferably made from a wear resistant material such as cemented carbide, cermet or cubic Boron Nitride. The turning tool is suitable for machining a metal work piece.

The turning tool comprises an insert seat, also known as an insert pocket, in which the turning insert is removably mounted or clamped, by means of e.g. a screw or a clamp or a lever.

The turning tool preferably comprises exactly one insert seat.

The rear end of the turning tool is coupling portion, suitable for connecting to a machine interface of a machine tool, such as a CNC-lathe. The rear end may comprise a tapered polygon and a flange. The rear end may be square shaped in a cross section.

A longitudinal axis extends from a rear end towards a forward end. The longitudinal axis is a geometrical center axis of the rear end, i.e. of the coupling portion.

A distance from the longitudinal axis to a distal portion of the turning is greater than a distance from the longitudinal axis to a distal portion of the tool body. By such a turning tool, out-facing is possible.

The insert seat opens towards the forward end.

The insert seat comprising a bottom surface and a side surface. At least a portion of the bottom surface and the side surface, respectively, are contact surfaces or support surfaces for contact with the turning insert. The bottom surface of the insert seat may be a portion of the tool body. Alternatively, the bottom surface may be in the form of a top surface of a shim or a shim plate. Such shim or shim plate is preferably made from cemented carbide.

The side surface comprising a first surface and a second surface, where the first and second surface form an angle relative to each other, where said angle is preferably 50°-160°, even more preferably 100°-150°. Each of the first and second surfaces preferably comprises contact surfaces or support surfaces. The side surface is preferably part of the tool body.

The turning insert comprising a top surface, an opposite bottom surface, and a side surface connecting the top and bottom surfaces. The top surface comprises a rake face. The top surface preferably comprises chip breaking means, preferably in the form of one or more protrusions or depressions. The side surface comprises a clearance surface. An intersection between the top and side surfaces form a cutting edge. The bottom surface of the turning insert, which bottom surface may be flat or non-flat, is in contact with the bottom surface of the insert seat.

The top surface of the turning insert is preferably 120° symmetrical or 180° symmetrical in a top view.

The first surface comprises a contact surface, wherein said contact surface is in contact with a portion of the side surface of the turning insert. In other words, the side surface of the turning insert comprises at least one, preferably two, support surfaces. Preferably, the side surface of the turning insert is in contact with a portion of the second surface.

The side surface of the turning insert runs uninterrupted from the top surface to the bottom surface. In other words, the side surface of the turning insert is a continuous surface, i.e. without any through-holes.

The tool body comprises a coolant channel formed in the tool body. Said coolant channel is thus an internal coolant channel.

The coolant channel extends between a coolant channel inlet, preferably opening in the rear end, and a coolant channel outlet formed in the first surface of the insert seat.

The coolant channel outlet is preferably circular or substantially circular in a cross section, having a diameter which preferably is 0.5-3 mm.

The coolant channel outlet is preferably arranged opposite or substantially opposite the side surface of the turning insert.

The coolant channel outlet opens into a void or cavity or gap between the side surface of the turning insert and the first surface of the insert seat. In other words, there is a gap between a portion of the first surface and portion of the side surface of the turning insert facing the first surface. Said void is thus arranged between the side surface of the turning insert and the first surface of the side surface of the insert seat.

The coolant channel outlet is arranged to direct a coolant stream towards the side surface of the turning insert such that said coolant stream is deflected towards the first surface of the insert seat. In other words, the side surface of the turning insert facing the first surface is arranged to deflect a coolant stream towards the first surface, where said coolant stream exits from the coolant channel outlet.

Said void comprises an outlet. Said void preferably opens into the forward end. In other words, said void preferably opens such that at least a portion of said coolant stream exits the void in a direction away from the rear end.

According to an embodiment, the coolant channel outlet is formed partly or completely in the first surface.

By such a cutting tool, the inventors have found that the risk of deformation of the tool body is further reduced.

According to an embodiment, the channel outlet is spaced apart from the side surface of the turning insert by a distance, which distance is 0.1-2.0 mm.

By such a cutting tool, the inventors have found that the risk of deformation of the tool body is further reduced.

According to an embodiment, the side surface of the insert seat comprises a third surface, wherein the first surface is facing the third surface.

By such a cutting tool, the performance in turning perpendicular to and away from the rotational axis of the metal work piece is improved, because the third surface can comprise a contact surface for such a machining direction.

The first surface is preferably parallel or substantially parallel to the third surface in a top view.

According to an embodiment, a distance from the contact surface to the top surface of turning insert is shorter than a distance from the contact surface to bottom surface of the turning insert.

In other words, the contact surface to the top surface of turning insert is shorter than a distance from the contact surface to bottom surface of the turning insert.

According to an embodiment, the contact surface is adjacent to the void.

By such a cutting tool, the wear of the contact surface can be further reduced.

According to an embodiment, a distance from the coolant channel outlet to the bottom surface of turning insert is shorter than a distance from the coolant channel outlet to the top surface of turning insert.

Preferably, the coolant channel outlet intersects a plane comprising the bottom surface of turning insert.

According to an embodiment, a distance from the longitudinal axis to the first surface is greater than a distance from the longitudinal axis to the second and third surfaces, respectively, wherein the coolant channel outlet is formed in the first surface.

According to an embodiment, the coolant channel outlet is arranged to direct a coolant stream in a direction away from the rear end and away from the bottom surface of the insert seat.

By such a turning tool, the temperature of an active nose portion of the turning insert is reduced, thereby increasing the time which the turning tool can be used.

In other words, the coolant channel outlet is arranged to direct a coolant stream in a forward direction and in an upwards direction, where the top surface of the turning insert is upwards of the bottom surface of the turning insert.

According to an embodiment, the turning tool comprises a shim, and the bottom surface of insert seat is defined by a top surface of the shim.

The turning tool thus comprises a shim or a ship plate. Said shim is arranged between the bottom surface of the turning insert and the tool body. A bottom surface of the shim is in contact with the tool body.

The turning insert and the shim are both arranged inside a cavity or a cut-out of the tool body.

The shim is preferably made from cemented carbide.

According to an embodiment, the turning insert is symmetrically or substantially symmetrically arranged around a center axis thereof, wherein said center axis intersects the top and bottom surfaces, wherein a distance from the longitudinal axis to the first surface of the insert seat is greater than a distance from the longitudinal axis to the center axis of the turning insert, and wherein the first surface of the insert seat is facing the center axis of the turning insert.

The turning insert is symmetrically arranged around said center axis such that the top surface of the turning insert is preferably 120° symmetrical or 180° symmetrical in a top view.

Preferably, in a top view a distance from the longitudinal axis to the coolant channel outlet is greater than a distance from the longitudinal axis to the center axis of the turning insert.

According to an embodiment, the tool body comprises a portion which is tapered in a top view such that a width thereof is decreasing in a direction away from the rear end, and wherein a border surface of said portion is the first surface of the insert seat.

Said portion is thus limited by a border surface defined by the first surface of the insert seat. Said portion is limited by a second border surface opposite the first surface of the insert seat. A distance from the longitudinal axis to the first surface of the insert seat is smaller than a distance from the longitudinal axis to said second border surface.

During machining, said second border surface is preferably perpendicular to or substantially perpendicular to the rotational axis of the metal work piece to be machined.

According to an embodiment, the top surface of the turning insert comprises a protrusion, wherein the protrusion is spaced apart from the side surface of the turning insert, and wherein a distance from the bottom surface of the turning insert to the protrusion is greater than a distance from the bottom surface of the turning insert to an intersection between the top surface and the side surface of the turning insert.

The protrusion comprises a chip breaker wall surface.

According to an embodiment, a turning method comprises the steps of: providing any of the above described turning tools; providing a metal work piece; rotating the metal work piece around a rotational axis thereof; setting the longitudinal axis of the turning tool perpendicular to the rotational axis of the metal work piece; supplying a coolant to the coolant channel such that a coolant stream is directed from the coolant channel outlet towards the side surface of the turning insert such that said coolant stream is deflected towards first surface of the insert seat; and moving the turning tool in a direction parallel to or substantially parallel to the rotational axis such that a machined surface is formed by a portion of the turning insert wherein the longitudinal axis of the turning tool is ahead of the machined surface being formed.

The moving the turning tool in a direction parallel to or substantially parallel to the rotational axis, commonly known as feed, is such that the first surface of the insert seat is facing the feed direction. The moving the turning tool in a direction parallel to or substantially parallel to the rotational axis is such that the longitudinal axis of the turning tool is ahead of the active nose cutting edge of the turning insert.

A machined surface is formed by metal cutting. The cut is preferably continuous. The cutting depth is preferably 0.5-10 mm, even more preferably 1-3 mm. The feed rate is preferably 0.6-1.2 mm/rev. The cutting speed is preferably 100-500 m/min. The length of cut is preferably above 200 mm, for example between 300 mm and 1000 mm. The coolant pressure is preferably above 5 bar.

According to an embodiment, the turning method further comprising the step of setting an entering angle (a) of the turning insert (3) to be at least 3° but not more than 30°.

DESCRIPTION OF THE DRAWINGS

The present invention will now be explained in more detail by a description of different embodiments of the invention and by reference to the accompanying drawings.

All turning tool figures have been drawn to scale.

DETAILED DESCRIPTION OF EMBODIMENTS OF THE INVENTION

Figures 3, 4:
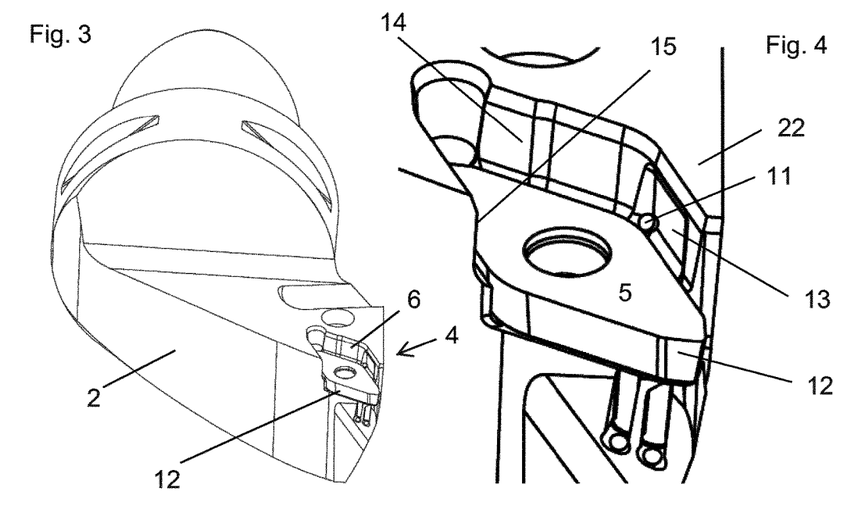
FIG. 3 is perspective view of the cutting tool in FIG. 2 without the turning insert.
FIG. 4 is an enlarged view of the insert seat in FIG. 3.

Reference is made to FIGS. 1-11, which show a turning tool 1 according to a first embodiment, comprising a tool body 2, a turning insert 3 and a shim 12. The turning insert 3 is mounted in an insert seat 4. A bottom surface 5 of the insert seat 4 is defined by a top surface of the shim 12. The insert seat 4 further comprising a side surface 6 formed by the tool body 2. As best seen in FIG. 4, the side surface 6 comprises a first surface 13, a second surface 14 and third surface 15 (hidden in FIG. 4). The first surface 13 is facing the third surface 15, such that the first surface 13 is parallel to the third surface 15 in a top view as seen in FIG. 8. Further seen in FIG. 8, the first and second surface form an angle β of 125° relative to each other.

Figure 6:
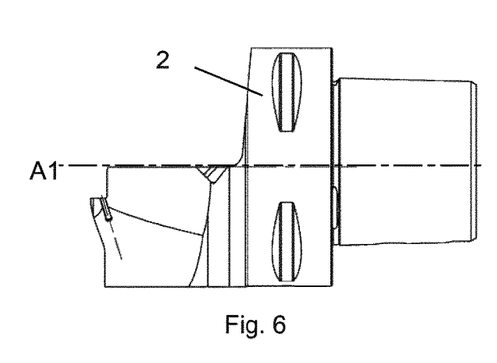
FIG. 6 is similar to FIG. 5 but without hidden lines.
Figure 7:
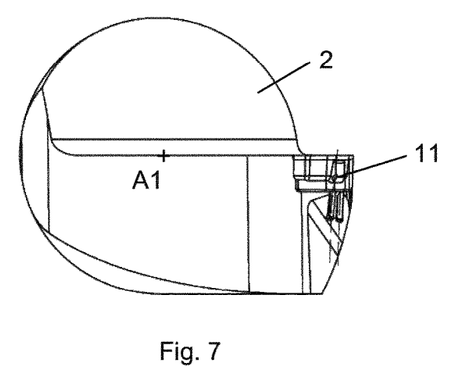
FIG. 7 is a front view of the tool body shown in FIG. 6.
Figures 9, 10:
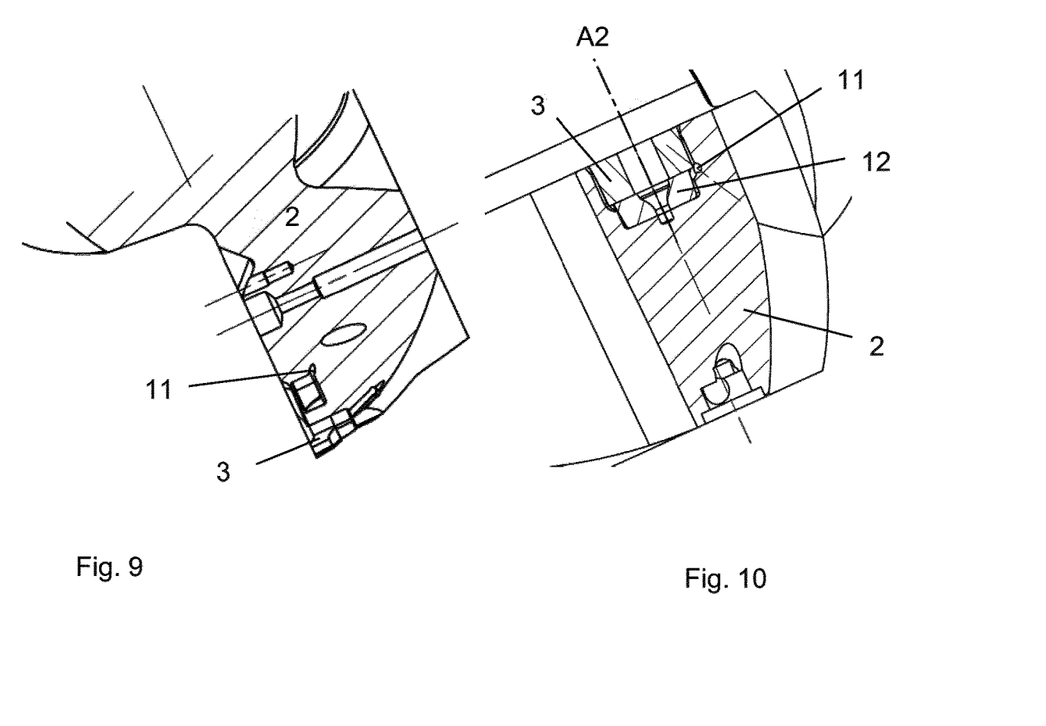
FIG. 9 is a cross sectional view along the line B-B in FIG. 8.
FIG. 10 is a cross sectional view along the line C-C in FIG. 8.

As seen in FIGS. 6-8, a longitudinal axis A1 extends from a rear end 16, comprising coupling portion suitable for connection to a machine tool, to a forward end 17 of the turning tool 1. The longitudinal axis A1 is a geometrical center axis of the coupling portion. The insert seat 4 opens towards the forward end 17. FIG. 9 an 10 show cross sectional views along the lines B-B and C-C, respectively, in FIG. 8.

Figure 1:
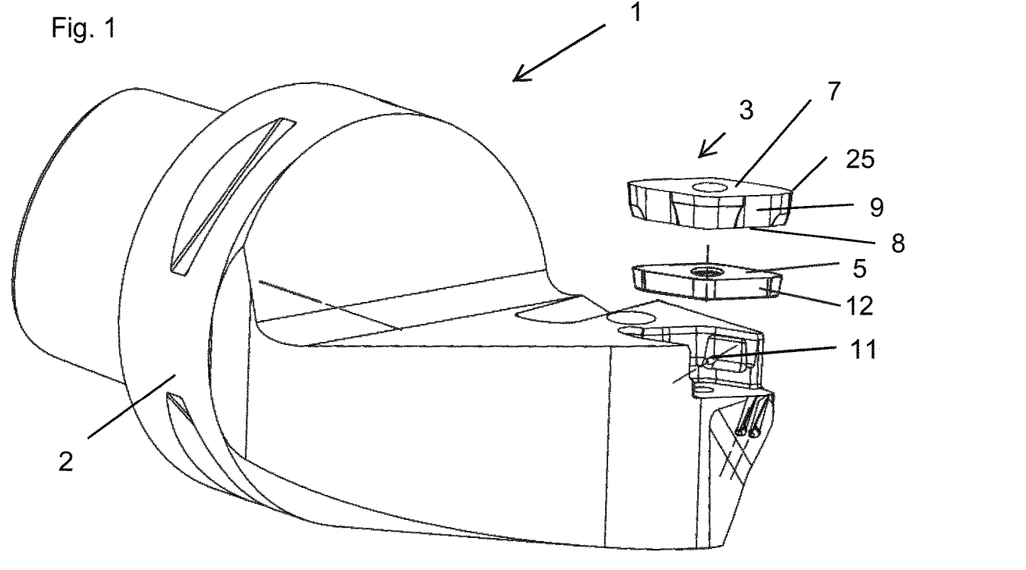
FIG. 1 is a perspective view showing a turning tool according to a first embodiment.

As seen in e.g. FIG. 1, the turning insert 3 comprises a top surface 7, an opposite bottom surface 8, and a side surface 9 connecting the top and bottom surfaces 7, 8. The side surface 9 of the turning insert 3 runs uninterrupted from the top surface 7 to the bottom surface 8. Thus, a coolant stream directed towards said side surface 9 is deflected away from said side surface 9 and towards the first surface 13.

The intersection between the top and side surfaces 7, 9 form a cutting edge, comprising a nose cutting edge 25. As seen in e.g. FIG. 11, the bottom surface 8 of the turning insert 3 is in contact with the bottom surface 5 of the insert seat 4, where the bottom surface 5 of the insert seat 4 is defined by the top surface of the shim 12. Further with reference to FIG. 11, the first surface 13 comprises a contact surface 19 in contact with a portion of the side surface 9 of the turning insert 3. A distance from the contact surface 19 to the top surface 7 of turning insert 3 is shorter than a distance from the contact surface 19 to bottom surface 8 of the turning insert 3.

Figure 11:
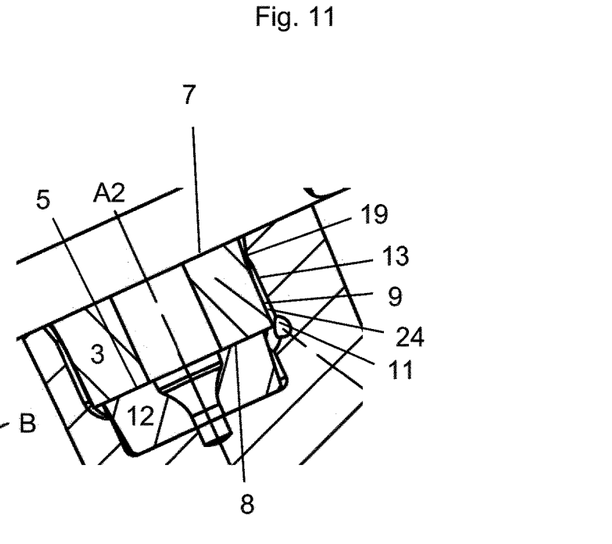
FIG. 11 is an enlarged view of a section of FIG. 10.

The second surface 14 comprises a contact surface in contact with the side surface 9 of the turning insert 3.

Figure 5:
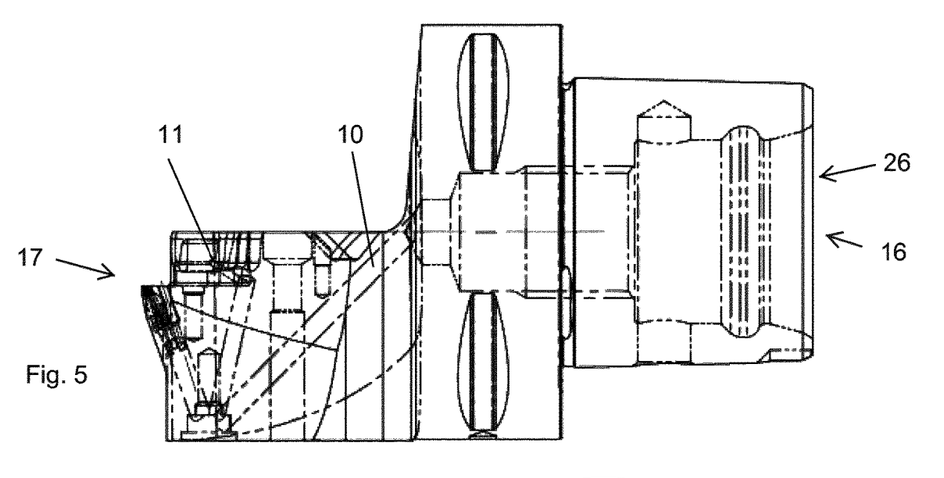
FIG. 5 is a side view of the tool body shown in FIG. 1 with the coolant channel and other features shown in hidden lines.

As seen in FIGS. 5 and 8, a coolant channel 10 is formed inside the tool body 2, suitable for delivering or transporting a coolant fluid from a coolant channel inlet 26 formed in the rear end 16 to a coolant channel outlet 11. The coolant channel outlet 11 is formed in the first surface 13.

The coolant channel 10 comprises a plurality of connected coolant channel sections. The coolant channel outlet 11 is the end of a straight coolant channel section having a circular cross section of a constant diameter.

As can be seen in e.g. FIG. 4, the coolant channel outlet 11 opens into the insert seat 4. As seen in FIG. 11, the coolant channel outlet 11 opens into a void 24, where said void 24 is formed between the side surface 9 of the turning insert 3 and the first surface 13 of the side surface 6 of the insert seat 4. The void 24 and the coolant channel outlet 11 is below the contact surface 19, where the top and bottom surfaces 7, 8 of the turning insert 3 defines up and down, respectively. The void 24 extends up to the contact surface 19.

As seen in e.g. FIG. 4, the tool body 2 comprises a portion 22 which is tapered in a top view, as in FIG. 8, such that a width thereof is decreasing in a direction away from the rear end 16. A border surface of said portion 22 is the first surface 13 of the insert seat 4. Said portion 22 is limited by a second border surface opposite the first surface 13 of the insert seat 4.

Figure 12:
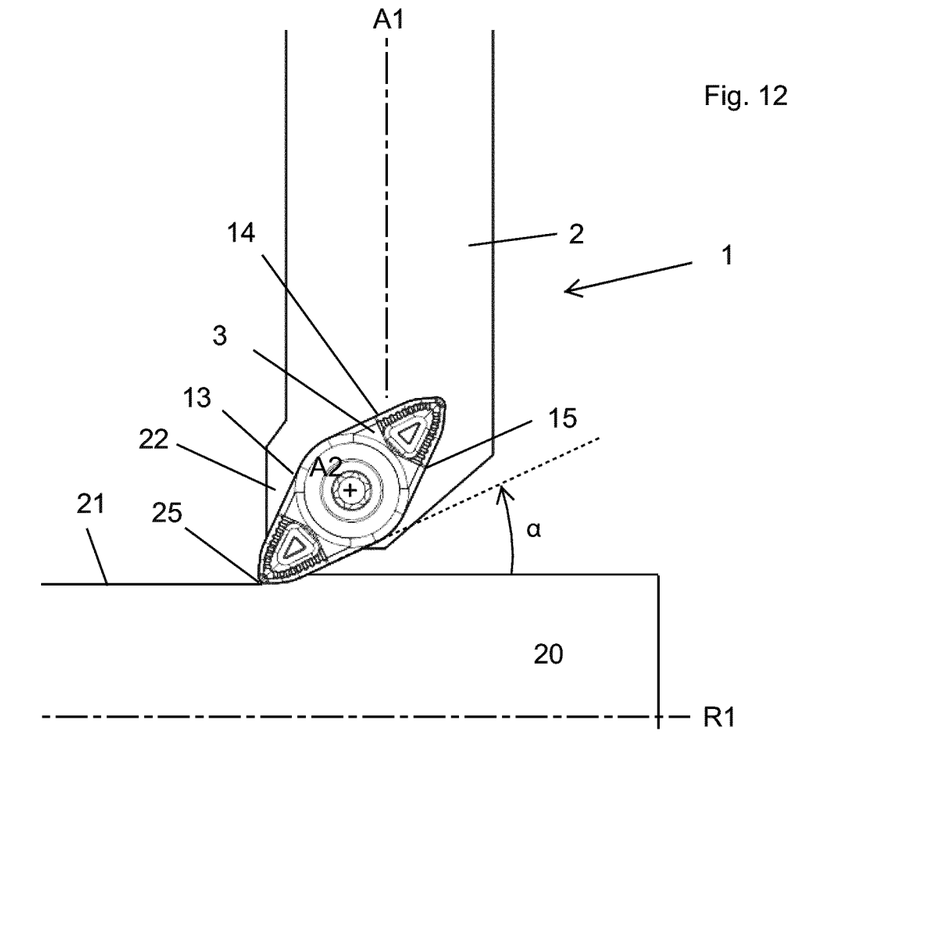
FIG. 12 is a top view showing a turning method including a cutting tool according to a second embodiment.

Attention is now drawn to FIG. 12, depicting a turning method. A turning tool 1 according to a second embodiment is provided. The turning tool 1 comprises a tool body 2 and a turning insert 3, shown in detail in FIG. 13. The principal difference between the turning tool according to the first embodiment and the turning tool according to the second embodiment is that for the turning tool 1 according to the second embodiment the rear end comprises a coupling portion which is square or rectangular in a cross section.

A metal work piece 20 is rotating around a rotational axis R1 thereof. The longitudinal axis A1 of the turning tool 1 is perpendicular to the rotational axis R1 of the metal work piece 20. A coolant fluid is supplied to the coolant channel via the coolant channel outlet such that a coolant stream is directed from the coolant channel outlet towards the side surface of the turning insert such that said coolant stream is deflected towards first surface of the insert seat.

The turning tool is set to go into cut. The turning tool 1 is moved in a direction parallel to the rotational axis R1, towards the right-hand side in FIG. 12, such that the longitudinal axis A1 of the turning tool 1 is ahead of a nose cutting edge 25 of the turning insert 3 forming a machined surface 21.

A distance from the longitudinal axis A1 to the first surface 13 is greater than a distance from the longitudinal axis A1 to the second and third surfaces 14, 15, respectively. The turning method comprises the step of setting an entering angle α of the turning insert 3 to be around 25°.

Figure 13:
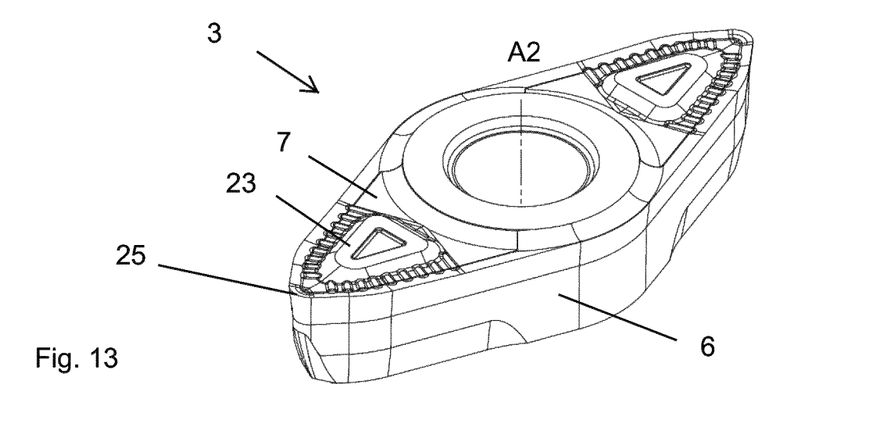
FIG. 13 is a perspective view of the turning insert in FIG. 12.

Attention is now drawn to FIG. 13, the turning insert 3, which is substantially similar to the turning insert found in the turning tool according to the first embodiment, is 180° symmetrical around a center axis A2 thereof. Said center axis A2 intersects the top and bottom surfaces 7, 8, and is concentric with a hole for a clamping screw. The top surface 7 of the turning insert 3 comprises a protrusion 23. Said protrusion 23 is spaced apart from the side surface 9 of the turning insert 3, and comprises a chip breaker wall.

The invention claimed is:

1. A turning tool comprising:
   a tool body;
   a turning insert symmetrically or substantially symmetrically arranged around a center axis; and
   an insert seat in which the turning insert is mounted, a longitudinal axis extends from a rear end to a forward end of the turning tool, wherein the insert seat includes a bottom surface and a side surface, the side surface having a first surface and a second surface, wherein the first and second surface form an angle relative to each other, the turning insert including a top surface, an opposite bottom surface, and a side surface connecting the top and bottom surfaces, the bottom surface of the turning insert being in contact with the bottom surface of the insert seat, wherein the first surface includes a contact surface, and wherein said contact surface is in contact with a portion of the side surface of the turning insert, the tool body including a coolant channel, the coolant channel extending between a coolant channel inlet and a coolant channel outlet, the channel outlet being spaced apart further from the center axis than the side surface of the turning insert, and wherein the coolant channel outlet opens into a void between the side surface of the turning insert and the first surface of the side surface of the insert seat.

2. The turning tool according to claim 1, wherein the coolant channel outlet is formed partly or completely in the first surface.

3. The turning tool according to claim 1, wherein the channel outlet being spaced from the side surface by a distance of 0.1-2.0 mm.

4. The turning tool according to claim 1, wherein the side surface of the insert seat has a third surface, the first surface facing the third surface.

5. The turning tool according to claim 1, wherein a distance from the contact surface to the top surface of the turning insert is shorter than a distance from the contact surface to the bottom surface of the turning insert.

6. The turning tool according to claim 1, wherein the contact surface is adjacent to the void.

7. The turning tool according to claim 1, wherein a distance from the coolant channel outlet to the bottom surface of turning insert is shorter than a distance from the coolant channel outlet to the top surface of turning insert.

8. The turning tool according to claim 1, wherein a distance from the longitudinal axis to the first surface is greater than a distance from the longitudinal axis to the second and third surfaces, respectively, and wherein the coolant channel outlet is formed in the first surface.

9. The turning tool according to claim 1, wherein the coolant channel outlet is arranged to direct a coolant stream outwardly in a direction away from the rear end and away from the bottom surface of the insert seat.

10. The turning tool according to claim 1, further comprising a shim, wherein the bottom surface of insert seat is defined by a top surface of the shim.

11. The turning tool according to claim 1, wherein the turning insert is symmetrically or substantially symmetrically arranged around a center axis thereof, wherein said center axis intersects the top and bottom surfaces, wherein a distance from the longitudinal axis to the first surface of the insert seat is greater than a distance from the longitudinal axis to the center axis of the turning insert, and wherein the first surface of the insert seat is facing the center axis of the turning insert.

12. The turning tool according to claim 1, wherein the tool body includes a portion which is tapered in a top view such that a width thereof is decreasing in a direction away from the rear end, wherein a border surface of said portion is the first surface of the insert seat.

13. The turning tool according to claim 1, wherein the top surface of the turning insert includes a protrusion, wherein the protrusion is spaced apart from the side surface of the turning insert, and wherein a distance from the bottom surface of the turning insert to the protrusion is greater than a distance from the bottom surface of the turning insert to an intersection between the top surface and the side surface of the turning insert.

14. A turning method comprising the steps of:
providing a turning tool according to claim 1;
providing a metal work piece;
rotating the metal work piece around a rotational axis thereof;
setting the longitudinal axis of the turning tool perpendicular to the rotational axis of the metal work piece;
supplying a coolant to the coolant channel such that a coolant stream is directed from the coolant channel outlet towards the side surface of the turning insert and such that said coolant stream is deflected towards first surface of the insert seat; and
moving the turning tool in a direction parallel to or substantially parallel to the rotational axis such that a machined surface is formed by a portion of the turning insert wherein the longitudinal axis of the turning tool is ahead of the machined surface being formed.

15. The turning method according to claim 14, further comprising setting an entering angle of the turning insert to be at least 3° but not more than 30°.

\* \* \* \* \*